Patented Jan. 9, 1951

2,537,352

UNITED STATES PATENT OFFICE 2,537,352

DYESTUFFS FROM PHTHALIMIDE DERIVATIVES

William Owen Jones, Blackley, Manchester, England, assignor to Imperial Chemical Industries Limited, a corporation of Great Britain No Drawing. Application August 26, 1947, Serial No. 770,753. In Great Britain September 7, 1946

7 Claims. (Cl. 260—326)

This invention relates to new colouring matters and in particular it relates to the manufacture of new colouring matters from phthalimide and its derivatives.

It is known that thiophthalimide condenses with aniline to form phenylimino-phthalimidine. This product, however, is very pale yellow in colour and has no commercial value as a colouring matter.

I have now found that certain derivatives of phthalimide as hereinafter defined will condense with certain aromatic hydrazines or aromatic amines to give intensely coloured, yellow to orange compounds which have high light fastness and good heat stability and are particularly valuable as colouring matters.

According to my invention therefore I provide a process for the manufacture of new colouring matters which comprises condensing iminophthalimidine, thiophthalimide or iminothiophthalimidine or a nuclear substituted derivative of any of these substances with an aromatic primary amine or a hydrazine which contains in addition to the amino or hydrazino group, either a second amino or hydrazino group, or a substituted amino or hydrazino group, or a pendant or a condensed ring attached to the aromatic nucleus.

As suitable nuclear substituted derivatives of iminophthalimidine, iminothiophthalimidine and thiophthalimide, there may be mentioned their methoxy, chloro and nitro derivatives and as suitable amines and hydrazines there may be used for example m- and p-phenylenediamine, dehydrothio-p-toluidine, 2 - aminobenzthiazole, 4 - aminoazobenzene, 4:4' - diaminoazobenzene, 4:4'-diaminostilbene, benzidine, o-tolidine, o-dianisidine, 3:3'-dichlorobenzidine, 5 - chloro-α-naphthylamine, 2 - aminoanthracene, 2-aminoanthraquinone, 1:4 - diaminoanthraquinone, 3-aminocarbazole, copper - tetra - aminophthalocyanine, 2:4-dinitrophenylhydrazine and phenylhydrazine-4-sulphonic acid.

When iminophthalimidine or a nuclear substituted derivative thereof is used in the condensation with an amine or a hydrazine, ammonia is split off during the condensation and when thiophthalimide or a nuclear substituted derivative thereof is used, hydrogen sulphide is split off, the product in both cases being an arylimino derivative or a mono-hydrazone of phthalimide.

When iminothiophthalimidine or a nuclear substituted derivative thereof is used for the condensation, the imino group is eliminated as ammonia and an arylimino derivative or a monohydrazone of thiophthalimide is formed.

When the amino or hydrazine used contained two or more primary amino or hydrazino groups, it may condense with one molecular proportion of the phthalimide derivative or with two or more molecular proportions depending on the conditions used for the reaction and on the number of amino and hydrazino groups in the amine or hydrazine. It is not usually practicable, however in such cases, to isolate in a pure state, the reaction product of the amine or hydrazine with one molecular proportion of the phthalimide derivative.

The reaction may be brought about by simply heating the reagents together or by heating the reagents together in the presence of a suitable solvent or diluent. Suitable solvents are for example alcohol and acetic acid, the latter being particularly useful when ammonia is split off in the condensation.

Instead of using the reagents mentioned, as the starting materials, other substances yielding the said reagents under the conditions of the interaction may be used. For example instead of iminophthalimidine, o-cyanobenzamide may be used.

The colouring matters obtained by the process of this invention may for example be used for colouring paper and also cellulose acetate, artificial silk and nylon textile materials, and for pigmenting polymeric materials such as for example polyvinyl chloride.

Water-soluble products containing sulphonic acid groups may be used for the dyeing of wool.

The invention is illustrated but not limited by the following examples in which the parts are by weight.

Example 1

1.1 parts of iminophthalimidine and 1.8 parts of dehydrothio-p-toluidine are added to 14 parts of acetic acid and the mixture is then boiled for two minutes. The reaction product separates from solution and forms a thick yellow paste which is then boiled with water and filtered and finally boiled with ethanol, filtered and dried. The yellow colouring matter so obtained may be crystallised from xylene when it forms bright yellow needles M. P. 275° C.

Instead of the 1.8 parts of dehydrothio-p-toluidine there may be employed 1.48 parts of p-aminoazobenzene. The product in this case when crystallised from xylene forms orange needles M. P. 221° C.

Example 2

1.6 parts of o-dianisidine hydrochloride, 1.5 parts of iminophthalimidine, 0.85 parts of fused sodium acetate and 3 parts of acetic acid are heated together at 100° C. for 1 hour. 50 parts of water are then added, the mixture is boiled for 5 minutes and then filtered. The residue is washed with water and dried. The yellow coloured product so obtained melts at above 260° C.

Example 3

1.84 parts of benzidine, 2.15 parts of dichloro-3-iminophthalimidine obtained as described below, and 10 parts of 80% aqueous acetic acid are heated together for 1 hour on the steam bath. The orange-yellow reaction product which separates during the heating is filtered, washed with water and dried. It melts above 300° C.

The dichloro-3-iminophthalimidine (M. P. 295° C.) employed in this reaction may be obtained by heating 3:4-dichlorophthalimide with urea at 160–170° C. in the presence of ammonium vanadate.

Example 4

1.9 parts of nitro-iminophthalimidine (obtained by heating 4-nitro-phthalimide with urea at 160–170° C. in the presence of ammonium vanadate) are mixed with 1.9 parts p-sulphophenylhydrazine and a small crystal of iodine, and the mixture is heated with 30 parts of ethanol on the steam bath for 1½ hours. On cooling, 3.2 parts of an orange-brown solid are obtained. This material is readily soluble in water and dyes wool in a bright orange shade.

Example 5

1.6 parts of o-dianisidine hydrochloride, 1.75 parts of methoxy-3-iminophthalimidine (obtained as described below), 0.85 part of fused sodium acetate and 5 parts of acetic acid are heated together at 100° C. for 1 hour. 50 parts water are then added, the mixture boiled and then filtered, washed with water and dried. The bright yellow product so obtained melts at above 260° C.

The methoxy-3-iminophthalimidine employed in this example is obtained from 4-methoxyphthalimide, which is converted by the action of concentrated aqueous ammonia solution to 4-methoxyphthalamide (M. P. 189° C. with ammonia evolution) which is then dehydrated with acetic anhydride to give 4- (or 5-) methoxy-2-cyanobenzamide (M. P. 164–6° C.), which is heated above its melting point to isomerise it to the 6- (or 5-) methoxy-iminophthalimidine (M. P. 233–5° C.).

Example 6

Instead of 1.1 parts of imino-phthalimidine used in Example 1 there can be used 1.44 parts of nitro-iminophthalimidine (obtained by heating 3-nitro-phthalimide with urea at 160–170° C. in the presence of ammonium vanadate). The product is an orange coloured solid.

Example 7

9.2 parts of benzidine and 14.6 parts of o-cyanobenzamide are intimately mixed and heated with stirring at 200° C. for 30 minutes. The product is crystallised from o-dichlorobenzene in yellow crystals melting above 300° C.

Example 8

A mixture of 1.6 parts of o-dianisidine hydrochloride, 1.65 parts of imino-thiophthalimidine, 0.85 part of fused sodium acetate and 10 parts of acetic acid is heated on the steam bath for one hour. The product is filtered hot, washed with 10 parts of acetic acid, then with 200 parts of water and finally with 100 parts of ethanol. The red colouring matter so obtained may be crystallised from o-dichlorobenzene, and it has melting point 289° C.

The imino-thiophthalimidine used as starting material may be prepared by passing hydrogen sulphide into a cold suspension of phthalonitrile in aqueous alcoholic sodium hydrogen sulphide. The resulting green solution is filtered and the imino-thiophthalimidine is precipitated from the filtrate as an orange solid on adding hydrochloric acid to reduce the alkalinity.

Example 9

7.5 parts of imino-phthalimidine and 2.75 parts of p-phenylenediamine are mixed together and charged into a stirred mixture of 20 parts of acetic acid and 100 of ethanol at 70° C. A deep orange solution results from which a yellow solid then separates. After 1 hour the mixture is filtered and washed with ethanol. The bright-yellow compound so obtained melts above 300° C.

Example 10

3 parts of 2-aminobenzthiazole and 3 parts of imino-phthalimidine are ground together and melted at 210–220° C. with stirring. Ammonia is freely evolved and the mixture solidifies. After about 3 minutes the product is boiled with 50 parts of acetic acid and allowed to cool. The bright yellow needles (M. P. 222° C.) which separate are filtered off, washed with water and dried.

Example 11

4 parts of imino-phthalimidine, 4 parts of o-dianisidine hydrochloride and 2.2 parts of fused sodium acetate are intimately mixed and heated at 200–220° C. for 1 hour. Ammonia gas is evolved during the reaction. The product is extracted with hot water and then with ethanol. The yellow coloured product obtained is identical with that described in Example 2.

Example 12

1 part of thiophthalimide, 0.8 part of phenyl hydrazine and 8 parts of acetic acid are heated together at the boil with stirring. Hydrogen sulphide is evolved and after two minutes there is a sudden separation of yellow solid. The mixture is diluted with water and filtered and the residue washed and dried. The product forms beautiful yellow needles when crystallised from 2-ethoxyethanol which melt at 227–229° C. and it may be regarded as the mono-phenylhydrazone of phthalimide. This new compound is soluble in dilute caustic soda from which it is precipitated unchanged on acidification. The dispersed pigment dyes acetate silk and nylon in lemon yellow shades.

Example 13

2 parts of imino-phthalimidine, 2 parts of phenyl hydrazine hydrochloride and 1.4 parts of fused potassium acetate are mixed and then heated with 40 parts of ethanol on the steam bath for ½ hour. 3.2 parts of a sparingly soluble yellow product are obtained identical with the product of Example 12.

I claim:
1. New compounds having the general formula:

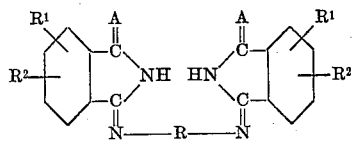

wherein A is a radical from the group consisting of =O and =S, R is a divalent aryl radical, $R^1$ is a radical selected from the group consisting of —H, —Cl, —OCH₃ and —NO₂ and $R^2$ is a radical selected from the group consisting of —H and —Cl.

2. New compounds of the general formula:

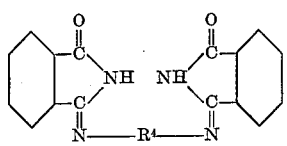

wherein $R^4$ is a divalent aryl radical.

3. The yellow-colored compound having the formula:

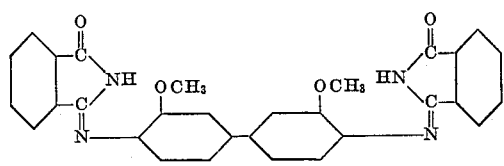

4. The orange-yellow-colored compound having the formula:

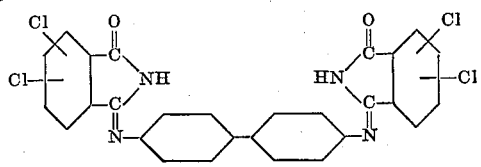

5. The yellow-colored compound having the formula:

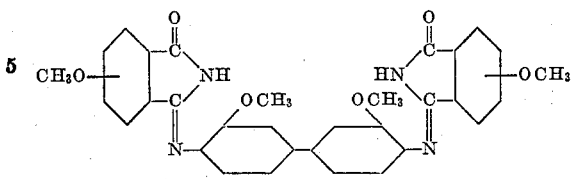

6. The red-colored compound having the formula:

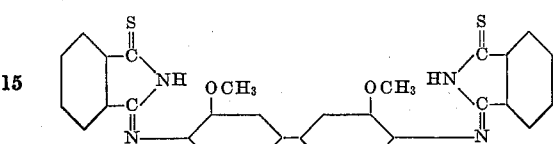

7. The yellow-colored compound having the formula:

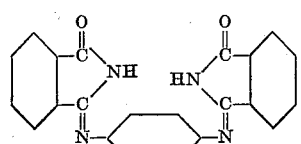

WILLIAM OWEN JONES.

REFERENCES CITED

The following references are of record in the file of this patent:

UNITED STATES PATENTS

| Number | Name | Date |
|---|---|---|
| 647,279 | Sandmeyer | Apr. 10, 1900 |

OTHER REFERENCES

Drew and Kelly: Jour. Chem. Soc. (London) (1941), pp. 625 to 641.